Sept. 10, 1957

R. R. READING 2,805,699

TIRE BUFFING APPARATUS

Filed Nov. 30, 1953

RALPH R. READING,
INVENTOR.

HUEBNER, BEEHLER,
WORREL & HERZIG,
ATTORNEYS.

BY Albert M Herzig

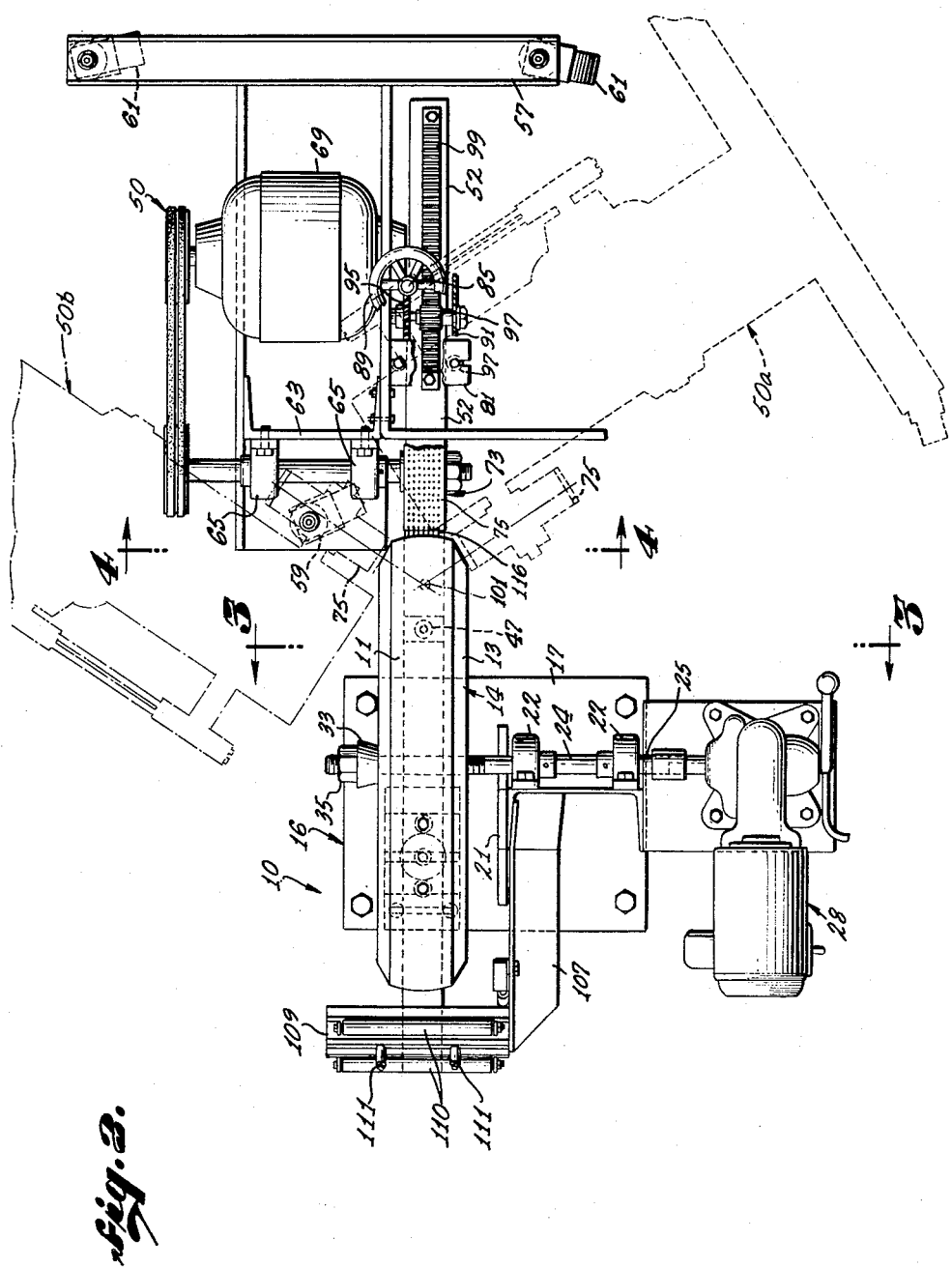

Sept. 10, 1957 R. R. READING 2,805,699
TIRE BUFFING APPARATUS
Filed Nov. 30, 1953 4 Sheets-Sheet 3
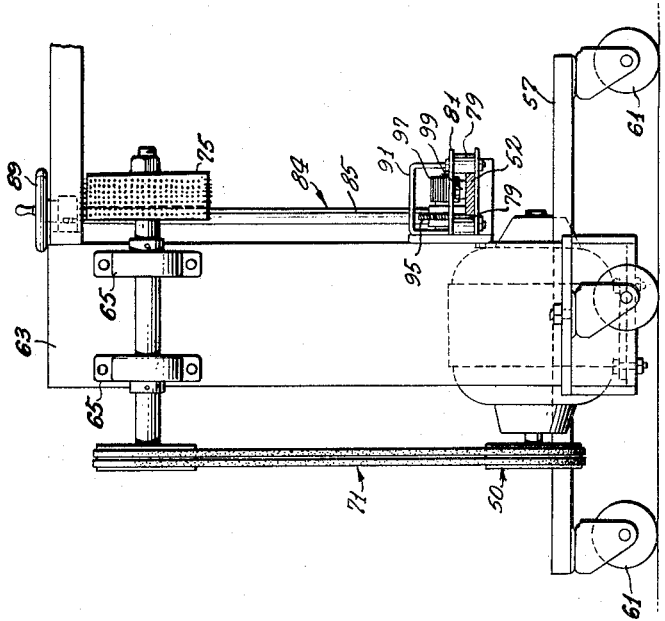
RALPH R. READING,
INVENTOR.
HUEBNER, BEEHLER,
WORREL & HERZIG,
ATTORNEYS.
BY

United States Patent Office 2,805,699
Patented Sept. 10, 1957

2,805,699

TIRE BUFFING APPARATUS

Ralph R. Reading, Hawthorne, Calif.

Application November 30, 1953, Serial No. 398,165

4 Claims. (Cl. 154—9)

This invention relates to a tire buffing and recapping apparatus and, more particularly, to a tire buffing and recapping apparatus which facilitates the formation on the crown of the tread of the tire of an arcuate configuration which is substantially identical to such arcuate configuration, as would be required to make each different size and shaped tire fit the curing mold more accurately.

Furthermore, the tire buffing and recapping apparatus of my invention includes means for applying the recapping rubber or "camelback" to the tread of the tire immediately after the completion of the buffing procedure, thus materially reducing the amount of time customarily expended in the application of said camelback and, incidentally, reducing the over-all cost of recapping or retreading a tire.

Tires are generally manufactured with a definite transverse arc across the tread or crown thereof, said arc being measured from a straight line drawn across the opposite beads of the tire and terminating at the crown thereof. The radius of the arc differs for different manufacturers of tires and for different sizes of tires, and to obtain the best recapping job it is necessary to change these arcs to the transverse arc of the mold in which the tires are to be cured.

Attempts have been made to accomplish this desirable end in the past by the utilization of template and other means which have been both time-consuming and inaccurate and have entailed the laborious utilization of heavy machinery to insert the specific template adapted to form the requisite arc on the tread of the tire.

It is, therefore, an object of my invention to provide a tire buffing and recapping apparatus which includes a frame for rotatably mounting a tire to be recapped or retreaded, and which also incorporates a carriage which is movable in reference to said frame and the tire mounted thereupon to carry a buffing wheel or rasp across the crown or tread of the tire on the frame to form an arc of the requisite radius on said crown or tread.

Another object of this invention is to provide a machine which can be used to turn to perfect round any usable tire which may have developed high or low spots, and to restore or change the original transverse arc thereof. An arbor is preferably so made as to use the same hub and wheel upon which the tire is to be used on the road.

An additional object of my invention is the provision, in an apparatus of the aforementioned character, of means for pivotally mounting and connecting the carriage to the aforementioned frame of the apparatus to permit the carriage to be moved in an arc with reference to the tread of the tire being buffed.

An additional object of my invention is the provision of an apparatus for buffing and applying recapping material to the tires which incorporates a carriage of the aforementioned character which includes means for the longitudinal translation thereof to cause the movement of the carriage in an appropriate direction to bring the buffing wheel or rasp mounted thereupon into engagement with, or to withdraw it from engagement with, said tire.

A further object of my invention is the provision of an apparatus for forming an arcuate configuration on the tread of a tire to be recapped which includes a fixed frame, said frame having tire-mounting means thereupon for rotating the tire and also including movable tie bar means permitting the pivotal affixation thereto of a movable carriage, the movable carriage being mounted on ground-engaging wheels which permit it to be translated in an arc with reference to the tread of the tire about the aforesaid point of pivotal connection to the fixed frame.

A further object of my invention is the provision of a tire buffing and recapping apparatus of the aforementioned character which includes guide means for feeding recapping or "camelback" material to the tread of the tire immediately after the buffing process upon said tread has been completed. The incorporation of means for feeding "camelback" to the tread of the tire in this fashion materially reduces the handling incidental to the application of "camelback" and thus reduces the over-all time consumed in accomplishing the recapping of the tire.

Another object of my invention is the provision of an apparatus of the aforementioned character which includes stitcher means provided upon the fixed frame of the apparatus for temporarily tacking the "camelback" to the previously buffed tread of the tire, thus insuring that the "camelback" applied as the tire is rotated on the fixed frame will remain upon the tread until the tire is securely fastened in the mold for curing.

In conventional processes of applying "camelback" to a previously buffed tread, it is first necessary to liberally paint a cementitious material on the buffed tread and to allow the cementitious material to dry for as long as an hour due to the relatively non-uniform manner of the application thereof, and also due to the fact that the cementitions material accumulates in globs and deposits in the relatively large recesses formed in the material of the tread during the buffing process. Due to the inequalities of deposition of the cementitious material, some of the cementitious material fails to dry at the same rate as the outermost portion thereof, so that "wet cement" blisters, or "gas blows," under the tread result, leading to a "tread blow" which results in the separation of the "camelback" from the tread of the tire during the use of the tire.

Another object of my invention is a method of applying "camelback" to a tire prior to the deposition of the tire in a vulcanizing mold which includes the steps of: buffing the tread of the tire, spraying the buffed tread with a uniform coating of cementitious material and immediately applying "camelback" to the tread after said cementitious material has been sprayed thereupon. This is a material advance over the prior art methods of applying "camelback" to a previously buffed tread in that the relatively long drying time incidental to the application of cementitious material by conventional methods is eliminated.

Furthermore, "tread blow" encountered in the use of conventional methods of application of the cementitious material is also avoided, thus resulting in prolonged tire life. And furthermore, by applying the cementitious material in a thin fine spray it dries immediately all over the surface of the tire, so that "camelback" may be promptly applied the moment that the spray operation is completed. The amount of cementitious material needed to secure the proper "tackiness" is also approximately one-fifth the amount required by the conventional brushing method. The instant method eliminates the conventionally required waiting period of from approximately one-half hour to two or even three hours while the excess cement, and particularly that which has been worked into the buffing crevices, pores, or other surface irregularities, has been thoroughly dried in an effort to prevent the aforementioned "wet cement" blisters and their attendant ill effects. Said undesirable required drying time has also been associated heretofore with a harmful dust accumulation on the resultant tacky cemented surface which weakens the preferred complete and uniform vulcanization and uniting of the tread integrally with the buffed surface. Attempts to avoid such dust accumulation ordinarily require the provision of a dust-proof drying room, with resultant increase of cost and overhead and wastage of space. In addition to the above, a saving by the instant method of approximately 80 percent of the heretofore required amount of cement or the like, and time for the application of same, is achieved.

Of course, the application of the "camelback" to the previously buffed tread immediately after the application of the cementitious material thereto materially reduces the time expended in the buffing and "camelback" application processes of the recapping procedure and thus reduces the over-all cost thereof to the operator of the recapping plant, while resulting in a more uniform and satisfactory product.

This invention also has among its objects the provision of improvements over prior art apparatus and methods heretofore intended to accomplish generally similar purposes.

Other objects and advantages of my invention will be apparent from the following specification and the accompanying drawings which are for the purpose of illustration only, and in which:

Figure 2 is a top plan view of the apparatus.

Figure 3 is an end elevational view of the fixed frame of the apparatus as seen from the broken line 3—3 of Figure 2.

Figure 4 is an end elevational view taken from the broken line 4—4 of Figure 2 and showing the movable carriage of the apparatus of my invention.

Figure 1:
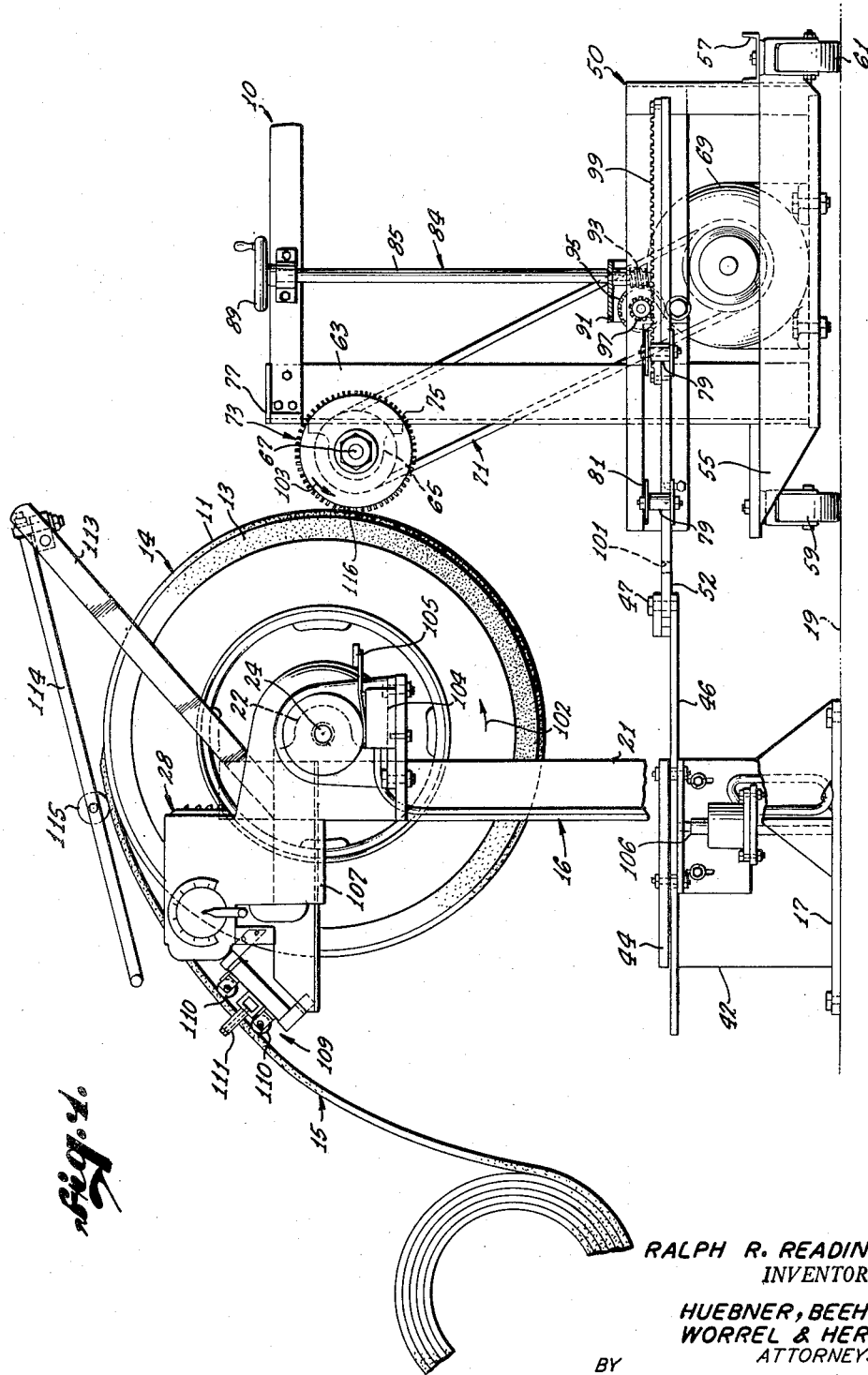
Figure 1 is a side elevational view of a buffing and recapping apparatus constructed in accordance with the principles of my invention.

Referring to the drawings, and particularly to Figures 1–4 thereof, there is shown an apparatus 10 constructed in accordance with my invention and designed to buff the tread 11 and the shoulders 13 of a tire 14, and to apply to the tread 11 a layer of recapping material or "camelback," generally indicated at 15. The apparatus 10 includes a fixed frame 16, said fixed frame being constituted by a bed plate 17 rigidly bolted to the surface of a level floor 19 and having welded, or otherwise affixed, thereto a vertical standard 21. Secured to the standard 21 adjacent the upper end thereof are laterally spaced pillow or bearing blocks 22, said bearing blocks providing a mounting for an elongated shaft or arbor 24 which is rotatable therein. One end 25 of the shaft 24 is connected to the shaft of a motor-speed regulator combination 28, said motor-speed regulator combination providing the source of motive power for rotating the shaft 24 in the pillow blocks 22.

The other end of the shaft 24 is threaded, and is provided with a stop nut 29 upon which abuts a frusto-conical locating collar 31, said frusto-conical locating collar having associated therewith another frusto-conical locating collar 33 which is retained upon the shaft 24 by a nut 35.

The locating collars 31 and 33 are urged into operative engagement with the hub 39 of a conventional automobile wheel 40 by threading the nut 35 inwardly on the threaded portion 27 of the shaft 24 and thus preventing relative rotation between the threaded portion 27 of the shaft 24 and the wheel 40. Therefore, when the motor-speed regulator combination 28 is energized, the shaft 24 and the wheel 40 mounted thereupon will be concomitantly rotated to cause the rotation of the tire 14.

Secured to a bracket 42 mounted on the bed plate 17 is a guide 44, said guide serving to maintain a longitudinally slidable tie bar 46 in operative engagement with the frame 16. The tie bar 46 is provided at its outermost end with a pivot pin 47 which serves as a means of pivotal connection or linkage for a movable carriage or vehicle 50 which constitutes another portion of the apparatus 10 and which is operatively and pivotally connected to the pivot pin 47 on the tie bar 46 by means of an elongated tongue 52. The movable tie bar 46 is kept in alignment by vertically oriented roller 117 secured on the guide 44, and is held in any desired longitudinal position by pressure applied by air clamp 106, which is actuated by releasing pressure on a button 105 which operates an air valve 104 to clamp the tie bar 46 against the top element of the frame guide 44 in any desired position.

The carriage 50 includes an elongated, axially oriented bed 55 which has secured to the rearmost end thereof a transverse channel member 57. A caster 59 is secured to the forward end of the bed 55, and casters 61 are secured to the opposite ends of the transversely oriented channel member 57.

A vertical standard 63 is fastened at its lowermost end to the bed 55 intermediate the ends thereof and has fastened adjacent its uppermost end a pair of pillow or bearing blocks 65 which mount a shaft 67 for rotation on the upper end of the vertical standard 63.

An electric motor 69 is secured to the bed 55 of the carriage 50 intermediate the ends thereof and is connected by means of a belt and pulley drive 71 to the shaft 67. Mounted for rotation by the shaft 67 on the outermost end thereof is a buffing means 73 constituted by a rotatable rasp 75. Secured to the uppermost end of the standard 63 is a handle 77, said handle being adapted to permit the carriage 50 to be moved on the casters 59 and 61 in an arc across the end of the fixed frame 16, for a purpose which will be described in greater detail below.

The carriage 50 is longitudinally movable with reference to the tongue 52, said tongue being located, as best shown in Figures 1 and 4 of the drawings, between vertically oriented rollers 79 which are mounted in a bracket 81 secured to the side of the vertical standard 63, as best shown in Figures 1 and 4 of the drawings.

Associated with the carriage 50 and, more particularly with the tongue 52 thereof, is means 84 for causing the longitudinal translation of said carriage toward or away from the fixed frame 16 and, more particularly, toward or away from the tread 11 of a tire 14 mounted for rotation on said fixed frame; and for drawing or pushing pivot point 47 to different longitudinal positions when air clamp 106 is inactivated, allowing tie bar 46 to move freely between the vertically oriented rollers 117 within said releasable clamping structure 44, etc. The means 84 for causing said longitudinal translation of the carriage 50 includes a drive shaft 85, the upper end of which is supported for rotation on a rearwardly extending arm 87 secured to the uppermost end of the standard 63.

A hand wheel 89 is secured to the upper end of the drive shaft 85 and is adapted to cause the rotation of the same. The lowermost end of the drive shaft is journaled in a U-shaped bracket 91 secured to the carriage 50 and has mounted thereupon a worm gear 93, said worm gear being in mesh with a pinion 95 which causes the rotation of a pinion 97, the pinion 97 being operatively engageable with a rack 99 which is secured at its opposite ends to the upper surface of the elongated tongue 52.

Rotation of the hand wheel 89 will cause concomitant rotation of the drive shaft 85 and the worm 93 affixed to the lowermost end thereof to cause concomitant rotation of the pinions 95 and 97 and the longitudinal travel of the pinion 97 along the rack 99 since the rack 99 is restrained against movement by its connection to the tongue 52 which is, in turn, pivotally connected to the pivot pin 47 of the tie bar 46. In this manner, longitudinal translation of the carriage 50 with respect to the frame 16 is accomplished. This same action would serve to shift the pivot point 47 and thus the buffing radius if the air clamp 106 were released to allow the tie bar 46 to slide freely longitudinally.

This is accomplished by simultaneously pressing lever 105 of air valve 104, which releases plunger of air clamp 106. Turning the wheel 89 draws the tongue 52 back and changes the position of pivot pin 47 from its position, shown in Figures 1 and 2, to a new position, e. g. 101, or any other position as desired, for buffing the side walls of the tread or to accommodate tires of different sizes and radii. The lever 105 is then released, allowing the plunger of the air clamp to apply pressure on the tie bar 46, securing it firmly to a new position.

The mode of operation of the apparatus 10 to accomplish the buffing of the tire 14 is as follows: A tire 14 and its associated wheel 40 are first installed upon the shaft 24 by removing the nut 35 and the associated frusto-conical locating collar 33 from operative engagement with the threaded end 27 of the shaft 24. The hub 39 of the wheel 40 is then installed on the mating locating collar 31 and the locating collar 33 and its associated nut 35 are then replaced on the threaded end 27 of the shaft to urge the hub 39 into operative engagement with the locating collar 31 and thus to secure the wheel 40 against rotation on the shaft 24.

The motor-speed regulator combination 28 is then energized to cause the rotation of the wheel 40 and the associated tire 14 in the direction indicated by the arrow 102 in Figure 1 of the drawings. It has been found that, for best results, the rotation of the wheel at approximately 10–15 R. P. M. is desirable for buffing the tire. After the rotation of the wheel 40 and the associated tire 14 has been initiated, the electric motor 69 is energized to cause the rotation of the buffing rasp 75. Since the diameter of tires varies in accordance with the requisite usage thereof, it is frequently necessary to advance or retract the carriage 50 in a longitudinal direction toward or away from the fixed frame 16 so that the buffing rasp 75 may be properly juxtaposed to the tread 11 of the tire 14.

Inasmuch as tires vary in diameter and in the desired transverse tread arc radius, it is necessary to adjust the tie bar 46 so that the pivot point 47 is in a desired position. The radius of the transverse arc is the distance between the pivot point 47 and an imaginary vertical line extended from a buffing point 116 (Figures 1 and 2) at the center of the operative buffing station.

To accomplish this desired end, the means 84 for longitudinal translation of the carriage 50 is energized by rotating the hand wheel 89 to cause rotation of the drive shaft 85 and concomitant rotation of the pinion 97 which traverses the rack 99 in an appropriate direction to cause appropriate longitudinal translation of the carriage 50. Guide rollers 79 mounted on the carriage 50 prevent lateral deflection of the tongue 52 to which the rack 99 is secured and thus prevent misalignment of the carriage 50 with respect to the tongue 52.

After the carriage 50 has been longitudinally translated in the appropriate direction to bring the buffing rasp 75 into engagement with the tread of the tire 14, the handle 77 of the carriage 50 is grasped to cause the carriage 50 to pivot about the pivot pin 47 and to carry the buffing rasp 75 in any desired arc across the tread 11 of the tire 14. Because of the movement of the carriage 50 in the transverse arc in which it is restrained by its pivotal connection through the tongue 52 to the pivot pin 47 on the tie bar 46, a symmetrical, arcuate configuration is formed on the tread 11 of the tire 14 without the necessity for the utilization of bulky and cumbersome templates such as are conventionally used to achieve the desired arcuate configuration of the tread.

Furthermore, when the buffing of the tread has been completed, it is frequently necessary to buff the shoulders or wings 13 on the sides of the tire 14. To accomplish this desired end, the tie bar is moved so that the pivot pin 47 is moved to shoulder buffing position, e. g., 101 (Figures 1 and 2), and the carriage 50 is moved into either one of the lateral positions shown in dash lines at 50a and 50b in Figure 2 of the drawings. When so located, the buffing rasp 75 can be engaged with the shoulders 13 on the tire 14 to form the proper configuration thereupon with respect to the tread 11 of the tire, the carriage 50 being advanced in a longitudinal direction by the utilization of the means 84 for longitudinal translation thereof. By providing for relative movement of the carriage 50 in both longitudinal and arcuate paths with respect to the tire 14 and, more particularly, the frame 16 upon which it is mounted, it is possible to achieve accuracy in the buffing operation which is extremely critical in obtaining optimum results in the retreading and recapping of the tire 14.

It should be noted at this juncture that the effective rasping surface of the rasp 75 is moved in a contrary direction to the subject surface of the tire 14, as indicated by the arrow 103 in Figure 1 of the drawings, and furthermore, that the buffing rasp 75 is rotated at relatively high speeds such as 3,450 R. P. M.

Secured to a bracket 107 which is affixed to the vertical standard 21 on the fixed frame 16 is a guide means 109 for the strip of "camelback" 15 to be fed to the periphery of the tire 14 and, more particularly, the buffed surface of the tread 11 thereof. The guide means 109 includes horizontally oriented rollers 110, said rollers 110 having vertically oriented, laterally adjustable rollers 111 associated therewith which are adjustable to permit them to center the "camelback" strips 15 of different widths on the tread surface 11.

Pivotally mounted upon an elongated support arm 113 attached to the vertical standard 21 of the fixed frame 16 is an elongated actuating handle 114, said handle bearing intermediate its ends for rotation thereupon a rotary stitching wheel 115 which is adapted, as best shown in Figure 1 of the drawings, to engage the upper surface of a strip of "camelback" 15 after it has been fed through the guide means 109 onto the tread of the previously buffed and prepared tire 14, and cut to length and the ends spliced.

Figure 5:
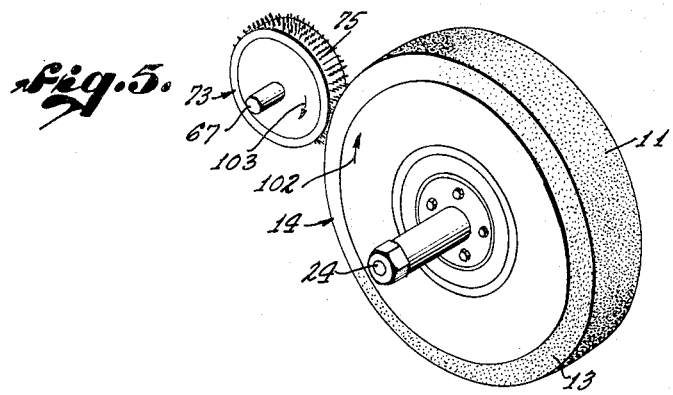
Figure 5 is an isometric view showing the buffing step of the method of my invention.
Figure 6:
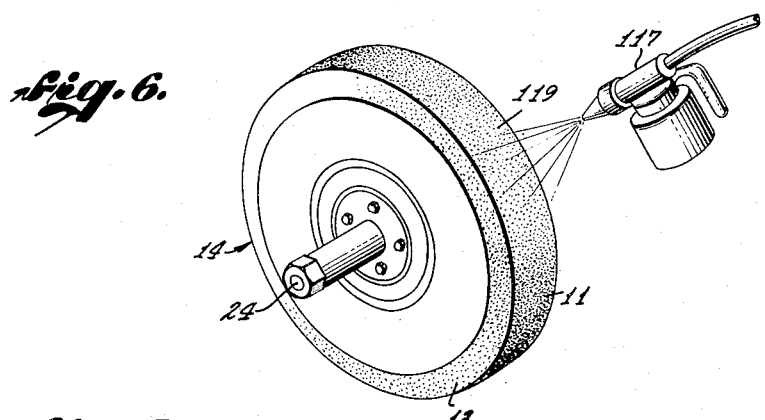
Figure 6 is a view showing the application by spraying of the cementitious material to the previously buffed tread of a tire.
Figure 7:
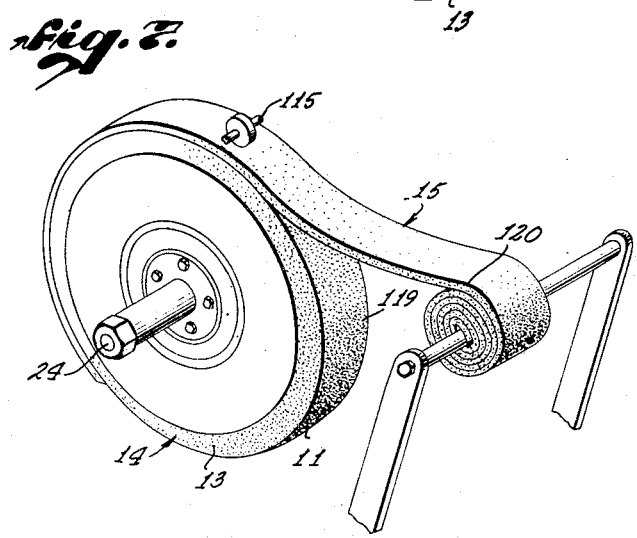
Figure 7 is a view showing the application to the tread of the tire of "camelback" stock.

The various steps of the method of this invention are graphically exemplified in Figures 5–7 of the drawings, wherein the tire 14 is shown as mounted on the shaft 24 for rotation therewith. As best shown in Figure 5 of the drawings, when the tire 14 is rotated on the shaft 24 in the direction indicated by the arrow 102, the rasp 75 is rotated in a direction as indicated by the arrow 103 upon the shaft 67, said rasp being carried in an arcuate path with reference to the tread 11 of the tire 14 to cause the formation upon said tread of an arcuate configuration which is substantially identical with the configuration of the mold in which the tire is to be cured.

After the completion of the buffing process upon the tread 11 of the tire 14, the carriage 50 is, as best shown in Figures 1 and 2 of the drawings, moved into opposite lateral positions wherein the buffing rasp 75 may be caused to operate on the shoulders 13 on opposite sides of the tread 11 of the tire 14 to cause said shoulders to be shaped in such a manner that after the "camelback" has been applied, the shoulder area of the prepared tire will be in conformity with the mold in which the tire is to be cured.

After the completion of the buffing operation, the tire is then rotated to permit a spray gun 117 to spray a coating 119 of cementitious material on the surface of the tread 11 and on the surface of the shoulder 13 of the tire 14. The cementitious material is necessary to adhere temporarily a layer of "camelback" to the tread of the tire and to retain it upon said tread until the tire can be placed in the curing mold.

In prior art recapping methods, the cementitious material, such as rubber cement, has been daubed upon the tread surface by the utilization of a brush. The inequality of application of the cementitious material inherent in this mode of application has resulted in unequal deposition of the cementitious material upon the tread of the tire. Therefore, when the process of coating the tread surface with cementitious material has been completed, it is necessary, frequently, to dry the tread for as long as one hour to dry the cementitious material prior to the application of the layer of "camelback" thereupon. Of course, the necessary drying time increases the length of time in which the tire is in process and, despite the length of the drying time, patches or globs of undried cementitious material are to be found in interstices formed in the tread of the tire by the buffing rasp 75. Therefore, when the heat and pressure required in the curing process are applied to the tread 11 of the tire 14, gas is formed by the heating of the undried cementitious material. Said gas sometimes collects in one small area, causing a gas pocket, or "tread blow," and other inequalities in the tread of the tire.

However, because of the fact that the utilization of the spray gun 117 permits the even, relatively thin coating of cementitious material to be deposited upon the surface of the tread 11, the "camelback" can be immediately applied thereto, as best shown in Figures 1 and 7 of the drawings. This is done by feeding the "camelback" from a roll 120 directly through guide means 109 onto the tread 11 of the tire 14 as it is rotated upon the shaft 24. After one full rotation the "camelback" is cut to length and spliced. To facilitate the application of the "camelback" to the tread 11, the stitcher 115 is urged downwardly into contact with the surface of the "camelback" to bind the "camelback" to the tread 11. Of course, the guide means 109 facilitates the application of the "camelback" to the surface of the tread 11 of the tire since it can be adjusted by the use of the adjustable rollers 111 to conform to the width of the "camelback" and thus to the width of the tread to insure that the "camelback" is properly aligned with the tread.

Thus, both the buffing process and the application of the "camelback" to the buffed tire can be accomplished by the use of the apparatus 10 of this invention, thus eliminating the time-consuming and expensive handling of the tire incidental to the use of conventional equipment. In other words, practically the entire recapping process, with the exception of the vulcanization step thereof, can be accomplished by the use of the apparatus 10 of this invention, and no need for dismounting the tire 14 from the apparatus arises since all of the necessary preparatory steps can be accomplished by the utilization of the apparatus 10.

Furthermore, the method of applying the "camelback" to the tread 11 of the tire 14 which entails the use of a sprayed coat of cementitious material permits the "camelback" to be applied immediately after the application of the sprayed coating of cementitious material, thus eliminating the drying step which is incident to conventional modes of application of the cementitious material.

Thus, by the utilization of the apparatus and method of this invention, it is possible to provide a recapped tire of much higher quality than has hitherto been obtainable by the use of conventional methods, and to accomplish the recapping process in much less time and at much smaller expense than has hitherto been possible.

Furthermore, by having the buffer movable instead of the tire stand, as in most other passenger-car-tire-retread-buffing-devices, the shoulder or side wall angle of the tire can be more easily adjusted by manually adjusting the pivot point, thus quickly adjusting for two different side wall angles on the same tire, i. e., in narrow white wall tires having an annular curb scuff-bar or lateral shoulder flange wherein the two shoulders on the same tire are not the same.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures, means and methods.

I claim as my invention:

1. In a tire buffing apparatus, the combination of: a frame having rotatable tire mounting means thereupon; a movable tie bar on said frame; a vehicle having an elongated tongue pivotally connected to said tie bar, said vehicle having a rotatable buffer thereupon for forming the tread of said tire; and means on said vehicle operable on said tongue for moving said vehicle in a longitudinal path toward or away from said frame to advance or withdraw said buffer to or from said tread.

2. In a tire buffing apparatus, the combination of: a frame having rotatable tire mounting means thereupon; a movable tie bar on said frame; a vehicle having an elongated tongue pivotally connected to said tie bar, means for releasably connecting said tongue to said tie bar at any desired position therealong, and said vehicle having a rotatable buffer thereupon for forming the tread of said tire; and means on said vehicle operable on said tongue for moving said vehicle in a longitudinal path toward or away from said frame to advance or withdraw said buffer to or from said tread.

3. In an apparatus for buffing the tread of a tire, the combination of: a fixed frame having a rotatable arbor for mounting said tire; a movable tie bar extending from said fixed frame, said tie bar having means for pivotal connection thereupon; a movable vehicle having an elongated tongue, clamp means releasably pivotally connectable to said tie bar for varying the position of the pivotal connection; means on said vehicle for longitudinally shifting said vehicle on said tongue; a buffer rotatably mounted on said vehicle and engageable with said tread by the longitudinal shifting of said vehicle; and means on said vehicle for translating it in a circular arc to carry said buffer in such arc across said tread.

4. In an apparatus for buffing the tread of a tire, the combination of: a fixed frame having a rotatable arbor for mounting said tire; a movable tie bar extending from said fixed frame, said tie bar having means for pivotal connection thereupon; a movable vehicle having an elongated tongue, means pivotally connected to said tie bar, said tongue having a rack thereupon; pinion means on said vehicle engageable with said rack for longitudinally shifting said vehicle on said tongue and shifting said tie bar in said fixed frame; a buffer rotatably mounted on said vehicle and engageable with said tread by the longitudinal shifting of said vehicle; and means on said vehicle for translating it in a circular arc to carry said buffer in a circular arc across said tread.

References Cited in the file of this patent
UNITED STATES PATENTS

| | | |
|---|---|---|
| 1,218,155 | Zimmerman | Mar. 6, 1917 |
| 1,760,879 | Maynard | June 3, 1930 |
| 1,983,684 | Strong | Dec. 11, 1934 |
| 2,009,524 | Schmidt | July 30, 1935 |
| 2,228,212 | Heintz | Jan. 7, 1941 |
| 2,230,027 | Cobb et al. | Jan. 28, 1941 |
| 2,243,707 | James | May 27, 1941 |
| 2,249,205 | Hansen | July 15, 1941 |
| 2,321,936 | Pollock | June 15, 1943 |

(Other references on following page)

UNITED STATES PATENTS

| | | |
|---|---|---|
| 2,329,301 | Schmidt et al. | Sept. 14, 1943 |
| 2,379,281 | Cramer | June 26, 1945 |
| 2,474,511 | Bacon | June 28, 1949 |
| 2,487,196 | Sternad et al. | Nov. 8, 1949 |
| 2,498,953 | Glynn | Feb. 28, 1950 |
| 2,556,264 | Flynn | June 12, 1951 |
| 2,605,195 | Boughton | July 29, 1952 |
| 2,622,378 | Stanley et al. | Dec. 23, 1952 |
| 2,690,207 | Godfrey | Sept. 28, 1954 |
| 2,758,037 | Cahill | Aug. 7, 1956 |